US012226048B2

(12) United States Patent
Belmont

(10) Patent No.: US 12,226,048 B2
(45) Date of Patent: Feb. 18, 2025

(54) KITCHEN CONTAINER FOR PREPARING FOOD COOKED "IN THE BARREL"

(71) Applicant: Jaime Gustavo Grana Belmont, Lima (PE)

(72) Inventor: Jaime Gustavo Grana Belmont, Lima (PE)

(73) Assignees: Jaime Gustavo, Lima (PE); Grana Belmont, Lima (PE)

( * ) Notice: Subject to any disclaimer, the term of this patent is extended or adjusted under 35 U.S.C. 154(b) by 329 days.

(21) Appl. No.: 17/554,084

(22) Filed: Dec. 17, 2021

(65) Prior Publication Data
US 2023/0190036 A1  Jun. 22, 2023

(51) Int. Cl.
A47J 37/04 (2006.01)
A47J 33/00 (2006.01)

(52) U.S. Cl.
CPC .............. *A47J 37/043* (2013.01); *A47J 33/00* (2013.01)

(58) Field of Classification Search
CPC ................................ A47J 33/00; A47J 37/043
USPC ........................................................... 99/415
See application file for complete search history.

(56) References Cited

U.S. PATENT DOCUMENTS

| | | | | |
|---|---|---|---|---|
| 3,299,800 A * | 1/1967 | Angelo | ............... | A47J 37/0704 126/369 |
| 6,622,616 B1 * | 9/2003 | Measom | ................. | A47J 27/04 99/347 |
| 8,365,717 B1 * | 2/2013 | Perry | ................... | A47J 37/0786 126/30 |
| 9,943,188 B2 * | 4/2018 | Fitzgerald | ............... | A47J 33/00 |
| 2005/0155498 A1 * | 7/2005 | Killion | ................. | A47J 37/0704 99/482 |
| 2005/0229916 A1 * | 10/2005 | Fitzgerald | ............... | A47J 33/00 126/25 R |
| 2006/0011192 A1 * | 1/2006 | Citrynell | ............. | A47J 37/0623 126/25 R |

FOREIGN PATENT DOCUMENTS

| | | | | |
|---|---|---|---|---|
| CN | 2115309 U | * | 9/1992 | ............. A47J 33/00 |
| CN | 105307546 A | * | 2/2016 | .......... A47J 37/0713 |
| CN | 109625672 A | * | 4/2019 | ............. A47J 33/00 |
| CN | 214030249 U | * | 8/2021 | ............. A47J 33/00 |
| DE | 10145023 B4 | * | 9/2005 | ............. A23B 4/044 |

\* cited by examiner

*Primary Examiner* — Eric S Stapleton
(74) *Attorney, Agent, or Firm* — Blank Rome LLP

(57) ABSTRACT

A device for roasting or spit-roasting food, including a container or barrel and a set of elements to support a meat on a rod, placed inside the barrel, in the center, resting on a tray that catches juices and fat, due to hot air directly exposed to the food, coming from the flame of a burner on which the tray rests. A deflecting cone is located underneath the tray, which has a double function: to collect excess fluids coming from the food being cooked, which overflow from the tray, or which leak due to breakage thereof, and as a diffusor of hot gases entering the container through an orifice in its base, towards inner walls of the barrel, promoting their circulation. Designed for domestic use, using a burner of a conventional gas stove, so that no smoke is generated during the cooking process.

12 Claims, 10 Drawing Sheets

KITCHEN CONTAINER FOR PREPARING FOOD COOKED "IN THE BARREL"

TECHNICAL FIELD OF THE DISCLOSURE

This disclosure is related to kitchen containers for preparing food, and it refers particularly to a container for roasting meat, preferably poultry, such as chicken, turkey or other, fixed to a rod or support inside the container, which allows cooking the food with hot air, coming from a stove burner on which the container is placed, and which circulates around the food.

BACKGROUND OF THE DISCLOSURE

Many cooking appliances have been developed, specifically to roast or fry food, such as beef, pork or chicken, which intend to solve problems and deficiencies of devices with the existing technique, by providing a device for cooking food using steam or hot air, not requiring oil.

It is interesting to define the terms used for cooking food:

Roasting: To cook food in an oven, spit or skewer, and grill; generally selected meat until the desired degree of doneness has been achieved. However, vegetables and fruits can also be roasted. Roasting gives food a characteristic flavor. This technique is considered very healthy, since fat is not added, because the cooking technique is dry.

Frying: Oil or fat is required for this procedure, since it consists of cooking food in a plenty of fat; the food being fried must float or swim in the oil. Generally, frying is used for: potatoes, "garnachas", and fish, to name a few. There is no doubt that this cooking technique is the least healthy, but it is used, nonetheless.

Spit-roasting. It is similar to roasting because food is cooked in dry hot air in a closed environment. Spit-roasted food not only browns, but it also acquires a specific finishing on the surface.

It is well known that in order to roast, fry or spit-roast this type of foods, especially meat, roasters with spits (long, thin and pointed spits are used to push, move or prick something on one end), such spits are conventionally placed horizontally, and the heat source in this type of arrangements is on one side, either underneath or beside the spit. Considerable preparation of the meat is required, and the food must be pierced with the spit. It is also necessary to use additional devices to place the food in the roaster. Meat, or other type of food to be cooked, is simply placed in the spit and exposed to fire generated by charcoal.

A very important element to consider when preparing greasy food is called smoke point, which refers to the maximum and exact temperature at which oil starts boiling, turning into smoke; above this temperature threshold, the oil or fat that burns starts generating toxic gases and free radicals that are harmful to the body and which pollute the environment. When heating oil above this point, it reaches the flash point and burns. This is evident when the liquid starts smoking; the food may acquire a flavor and smell that change the taste and essence of the food totally. It is therefore necessary to prevent fat from reaching such temperature.

Some examples of devices developed for roasting, frying or spit-roasting, which intend to overcome such disadvantages are the following:

U.S. Pat. No. 2,049,481 (Walterspiel, 1936), which describes an electrical, vertical symmetrical roaster, with a vertical spit and means on the spit to support the item to be roasted, and various heat sources, resistance-wire type, placed circumferentially around such rod, symmetrically on both sides of it, a vertical spit and means to make such spit turn, a circular tray to catch the drippings from the food, which upper surface has been provided with a central hole in which the spit is inserted rigidly, but it is removable, and means to direct an air current symmetrically upwards from underneath such tray, and along the underneath surface thereof, where the tray is placed regarding such heat sources, in such way that the tray and its contents are not exposed to the radiant energy of such heat sources. The body of the roaster has central openings in its upper lid, to allow a symmetrical flow of the air currents. The device has been designed to heat with electrical resistances.

U.S. Pat. No. 4,372,199 (Brown, et al., 1983) describes a kitchen appliance with vertical skewers, placed in a circle around a central heating element placed vertically. The skewers rotate individually regarding the heating element. This invention is aimed at a new spit chimney structure that promotes uniform cooking of the food on the skewers, as well as easy extraction for cleaning, and a novel mechanism for activating the skewers, which allows removing and replacing them easily during the use of the kitchen. This device only works with electricity.

U.S. Pat. No. 5,896,810 (Barbour, 1999) shows a frying appliance, specifically designed for deep-frying turkey or other similarly shaped food items. The device has a central rod attached to a perforated plate that is used to support a turkey as it is lowered into and removed from a large container with hot oil. The frying device also includes a grab hook that attaches to the central rod and allows user to prevent burns from exposure to hot oil when removing or inserting the turkey. The device is limited to frying food by immersion in oil.

U.S. Pat. No. 6,314,869 (Burgeois Jr., 2001) describes a kitchen pot appliance that includes a pot and food holder or perforated liner. The food holder can be a turkey frying device, for example. A drip rack may be used to support the food holder. During use, the support may be placed on the upper annular rim of the pot, to drain the oil from the cooked food. A drip rack provides a pair of sections placed at an angle that can support the liner. The device is also limited to frying in oil.

U.S. Pat. No. 6,363,826 (Usherovich, 2002) provides a roasting unit with a cooking chamber, a control panel, and a convection heating set; in one embodiment, a kitchen appliance is shown with a cooking chamber set to receive food and define a cavity, it has a heating element inside the cooking chamber, a convection heating set is included, placed remotely from the heating element and with a removable container supported inside the chamber cavity; the device may include a housing. In an alternative presentation, a roasting device is shown, with a set of spits inside the cooking chamber for rotation with regard thereto, and support of the food items. The device may also include a control unit.

U.S. Pat. No. 9,943,188 (Fitzgerald, 2018) describes a method and an appliance to charcoal cook food, using a cooking base and a removable cover that attaches to the cooking base. The appliance has an internal cooking chamber substantially sealed to cook food and an external portion with a charcoal heating source, near the lower part of the cooking base, and another charcoal heating source in the upper part of the removable cover, separating in this way food from fire. There is an upward hot air flow pattern inside the device, heat is provided by the heat source that surrounds the lower section of the device, and downwards, from the upper lid that supports the second heat source, which allows having several possible levels for different types of food; the air inside the device has no exit to the outside, so it stays inside during the whole cooking process.

In general, in all the aforementioned cases, a lot of heat is wasted to the surroundings, and it does not cook the food, the flame is usually on one side, and it is not possible to achieve a crunchy skin all around, because when the skewer turns, the part of the food that was over the fire moves to a position where heat is less intense. Also, the fat that drips from the food falls on the fire, where it burns, causing an unpleasant burning smell, and polluting the environment. Several of the alternatives mentioned also involve an electric heat source, or if they use a domestic gas source, they require adding fat or oil, and in case they use wood or charcoal, they imply outdoor cooking.

Purposes of the Disclosure

In view of the limitations of conventional processes, one of the purposes of this invention is to provide a kitchen container for preparing roasted, fried, or spit-roasted food, without the need for additional oil or fat, cooked by the heat provided by an ordinary gas burner.

Another purpose of this invention is to provide a portable kitchen container for preparing roasted or spit-roasted food.

Another purpose of this invention is to provide a kitchen container for preparing roasted or spit-roasted food, which heat source is a conventional gas stove burner, available in many homes with a gas kitchen.

It is another purpose to provide a kitchen container for preparing roasted or spit-roasted food, where the food is cooked "in its own juice", in order to obtain a crunchy browning and texture, comparable to those from a conventional spit-roaster.

An additional purpose is to provide a kitchen container for preparing roasted or spit-roasted foods, in such way that no smoke is generated during cooking.

These and other purposes shall be evident in the following description and in the attached figures, which intend to illustrate the invention without limitation.

BRIEF DESCRIPTION OF THE INVENTION

This invention refers to a device for roasting meat, preferably chicken, turkey or a similar food, which consists of a container or barrel and an insert especially designed to support the meat in a centered position within the barrel. The insert is comprised of a base to support the set, with an upper ring to receive a deflecting cone that directs the rising hot gases that come from a burner in a gas stove, which are used as cooking means, and which go through a large hole in the base of the barrel, towards the internal walls of the barrel, to produce an internal current for heating the food to be cooked; such food is supported by a rod or support, comprised by rods and rings that allow hot air to flow around the food, and which rests on a tray made of a non-ferrous material, which catches the juices and fat coming from the food as a result of the hot air that surrounds it, and prevents the fat from reaching its smoke point; the deflecting cone is located underneath such tray; it directs the intense heat coming from the flame towards the walls in an upward direction, to prevent excessive heating of the tray. It also collects any excess liquid coming from the food that is being cooked, which overflows from the tray, or leaks in case the latter breaks.

DETAILED DESCRIPTION OF THE DISCLOSURE

This invention refers to a container for roasting or spit-roasting food such as meat, especially chicken or turkey, by the direct action of hot air produced by a flame of a domestic gas stove, without producing smoke.

The container of the invention and its components are illustrated, for a better understanding of the following description, in the attached figures, which do not intend to limit the configuration of the invention, but to illustrate it.

Figure 1:
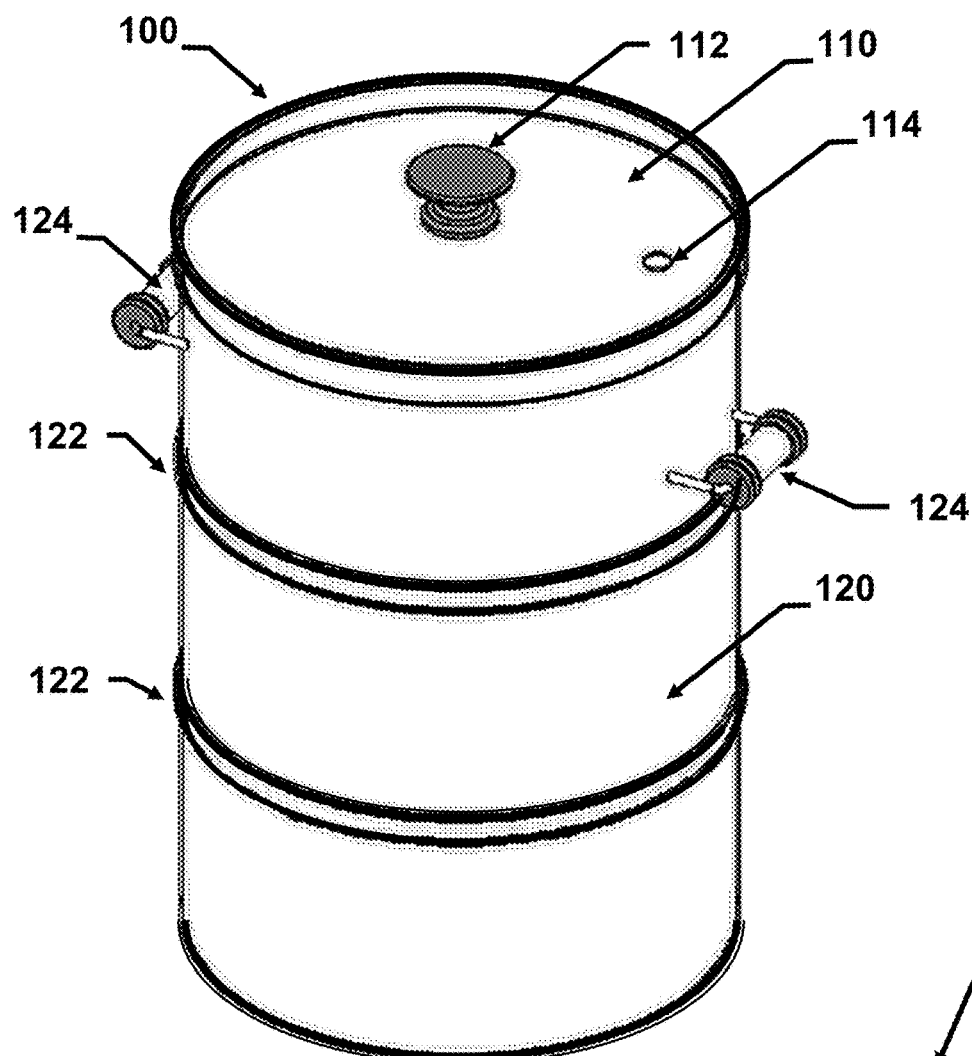
FIG. 1 is a simple perspective schematic view of the kitchen container of the invention.

FIG. 1 illustrates the external appearance of the container of the invention (100), where the external container or barrel (120) can be appreciated, as well as a straight hollow metallic cylinder that includes two handles (124) made of an insulating material for transportation of the container (100), located diametrically opposed; a lid (110), with an external diameter that can be adjusted, in an embodiment, to the external upper border of the barrel (120) in an embodiment, or alternatively, to the internal upper border of the barrel (120), with an orifice (114) to release pressure and to ventilate hot air when the container is operating; the lid includes a knob (112) to put on the lid (110) and to remove it from the barrel (120); the barrel (120) includes reinforcement peripheral rings (122) to prevent deformations due to changes in pressure caused by heating/cooling of the air contained inside it, when in use.

Figure 2:
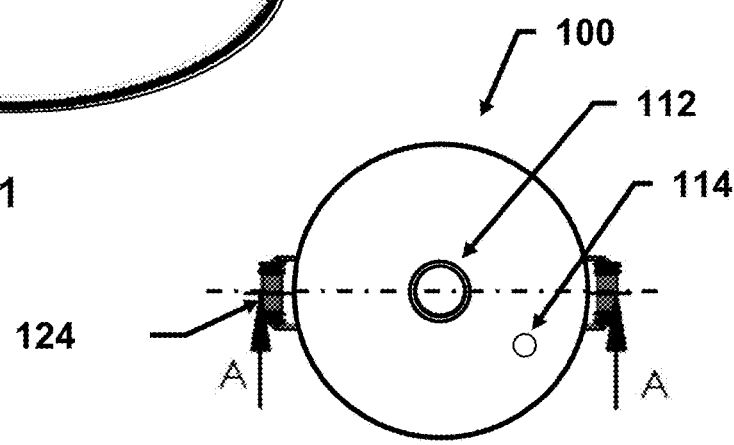
FIG. 2 is an upper plane schematic view of the kitchen container of the invention, showing a section line for FIGS. 5 to 7.

FIG. 2 illustrates an upper plane view of the lid (110), the position of the handles (124), the knob (112) and the ventilation orifice (114), and it includes an indication of the "A-A" section line related to FIGS. 5 to 7, which are described later.

Figure 3:
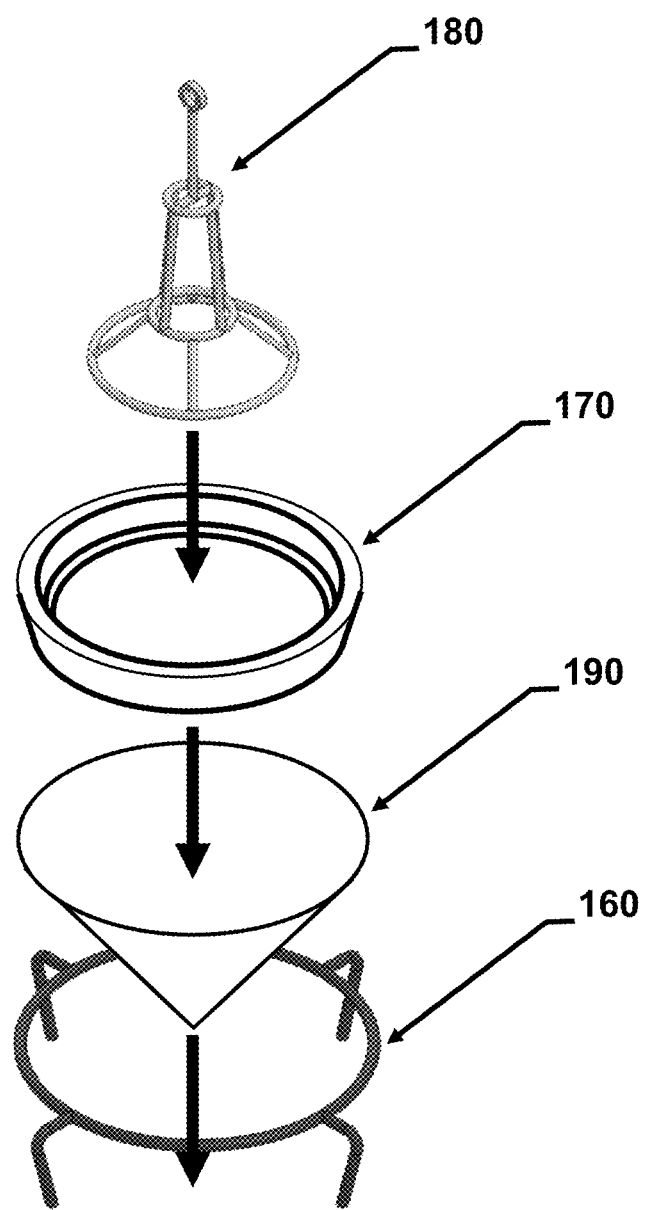
FIG. 3 is a schematic representation of the internal elements of the kitchen container of the invention regarding use.

FIG. 3 schematically illustrates in an exploded simple perspective view, the set of internal elements of the container of the invention (100), regarding the use indicated by the arrows, and which are mentioned below as follows:
- a rod (180) to support the food to be cooked in the center inside the invention container (100),
- a tray (170) for catching juices and fat from the food to be cooked,
- a deflecting cone (190), with its vertex facing downwards, to deviate and direct the hot air towards the internal wall of the barrel (120) in an upward direction, and to catch the contents of the tray (170), in case of overflow or rupture thereof, and
- a base (160) to support the set of internal elements on the bottom of the barrel (120).

Figure 4:
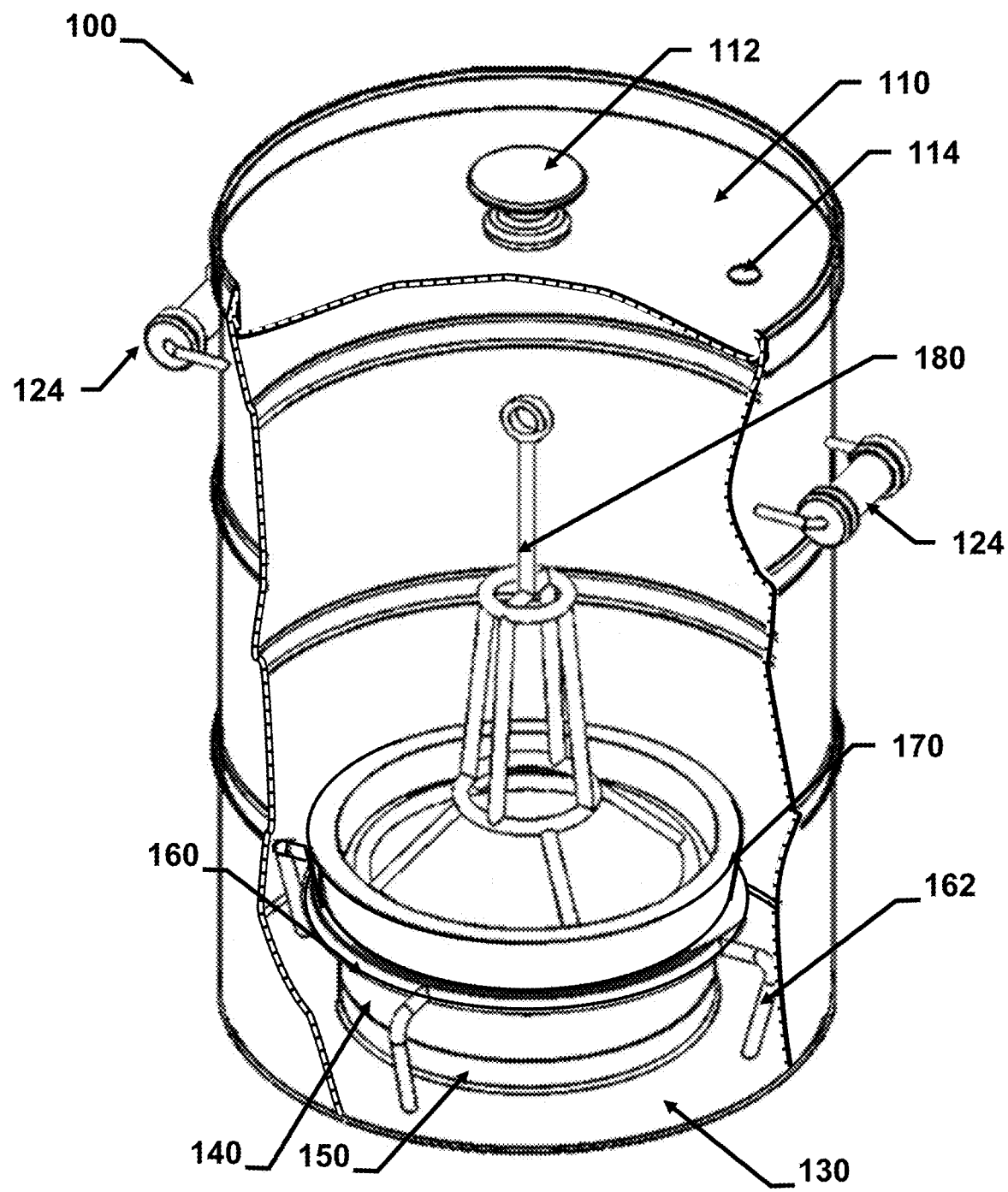
FIG. 4 is a simple perspective schematic view of the kitchen container of the invention, with a front section to appreciate the internal components in their position for use.

FIG. 4 shows a representation of the invention container (100) with a front section of the barrel (120) and the lid (110) for a better view of the interior; it can be noted that the bottom of the barrel (120) has an inferior circular orifice (140), centered and with a border (150) that projects upwards, through which the air enters and/or exits to/from the barrel (120); between the barrel (120) wall and the rim of the internal orifice (150), there is a peripheral ring (130) that constitutes the base of the barrel (120) on which the legs (162) of the base of the set rest, in such way that the internal elements (160. 170, 180 and 190) are located in the center of the barrel (120).

Figure 5:
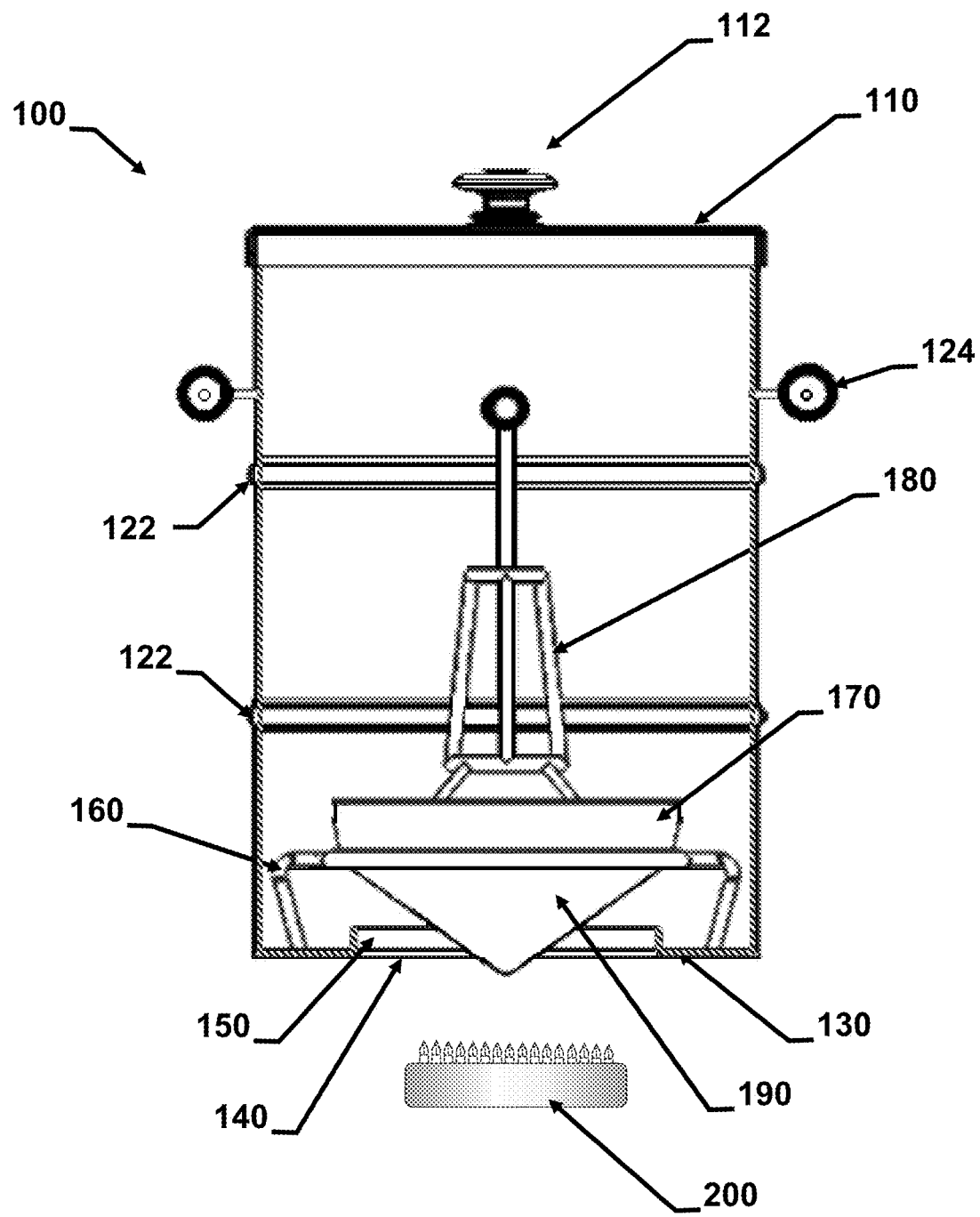
FIG. 5 is a frontal sectional schematic view of the barrel wall, along the A-A axis indicated in FIG. 2, of the kitchen container of the invention, showing the internal elements in position for use.

FIG. 5 shows the layout of the internal elements (160, 170, 180 and 190) in a frontal view of the invention container (100) with a transversal section of the barrel (120) wall along the "A-A" line, according to FIG. 2. It can be observed that the cone (190) acts as a deflector of the hot air that enters through the orifice (140), directing it towards the inner wall of the barrel (120) in an upward direction, promoting the convection of the air that has been heated by the heat from the gas burner (200) of a conventional domestic stove. In FIG. 6 the direction of the hot air current is illustrated schematically, following the dotted lines indicated by the letter "C", in such way that it circulates and is in contact with the exposed surface of the food stuck on the spit (180). Note that in order to prevent excess pressure, the lid (110) includes a ventilation orifice (114) through which excess air is ventilated (V).

The individual components of the invention container (100) are described in detail below.

Barrel (120)

Figure 7:
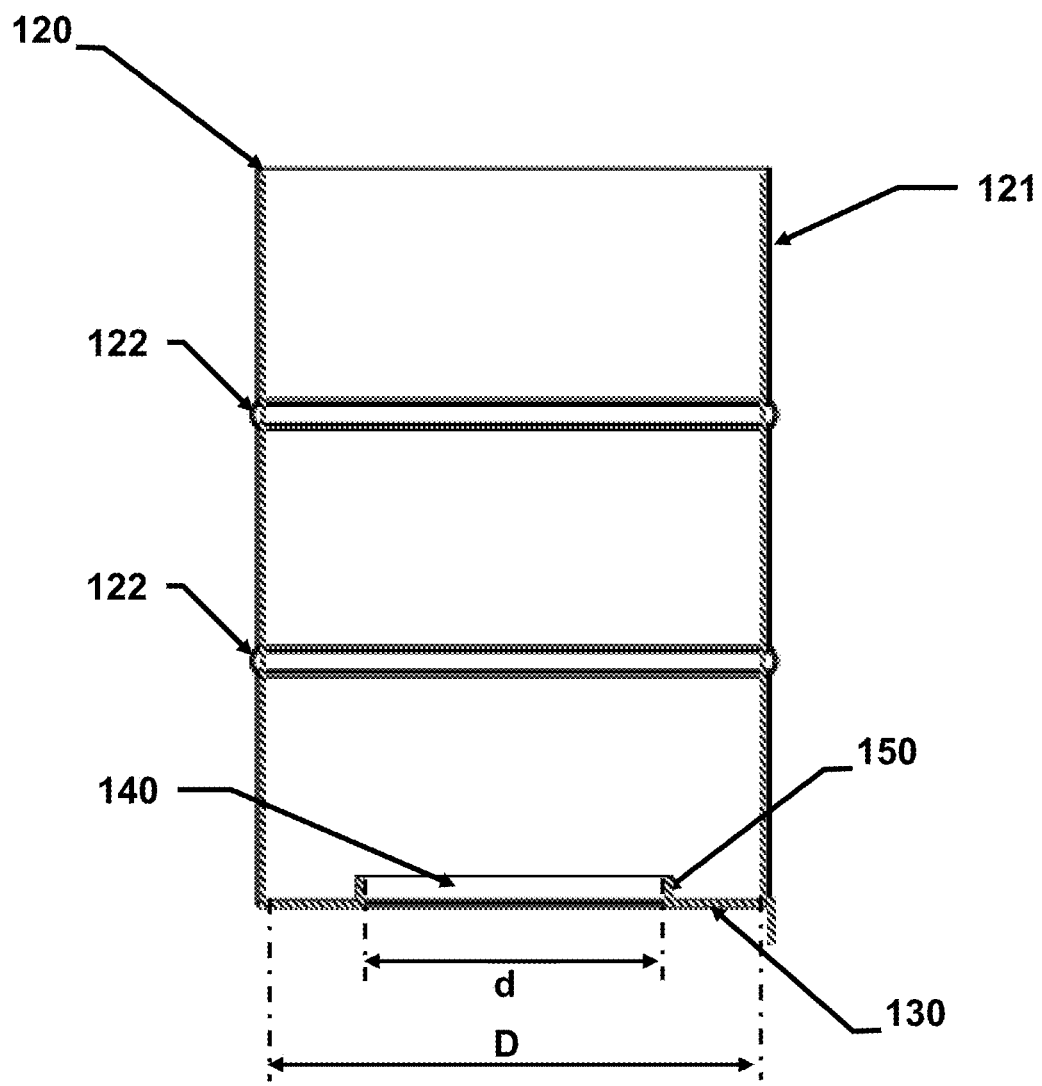
FIG. 7 is a simple perspective schematic representation of a vertical longitudinal section along the A-A line of FIG. 2 of the "barrel" body of the container of the invention.

The barrel (120), illustrated in FIG. 7, as described above, is a cylinder manufactured preferably from a metal sheet with around 1.5-mm thick; the orifice in the inferior face has a diameter (d) regarding the internal diameter (D) of the barrel (120) of d/D=0.6, and the height of its inner rim (150) is 15 to 20 mm. The vertical wall of the barrel (120) shows external reinforcement rings (122) to prevent deformations of the barrel (120) due to temperature changes, such reinforcement rings (122) are formed by corrugating the wall during manufacturing, or independently formed and subsequently fixed by conventional means, such as welding.

Handles (124)

The handles (124) for transportation of the container (100) are located diametrically opposed, they include a grip of an insulating material and a support axis, preferably metallic, comprised by a rod in a "U" shape, which length allows to hold it from the insulating grips, and where the arms of the "U" are projected perpendicularly to the main axis at such a distance that its ends are fixed to the barrel (120) body by any conventional means, allowing user to introduce his/her hands without having contact with the external wall of the barrel (120), to prevent burns when the container of the invention (100) is hot.

Lid (110)

Figure 8:
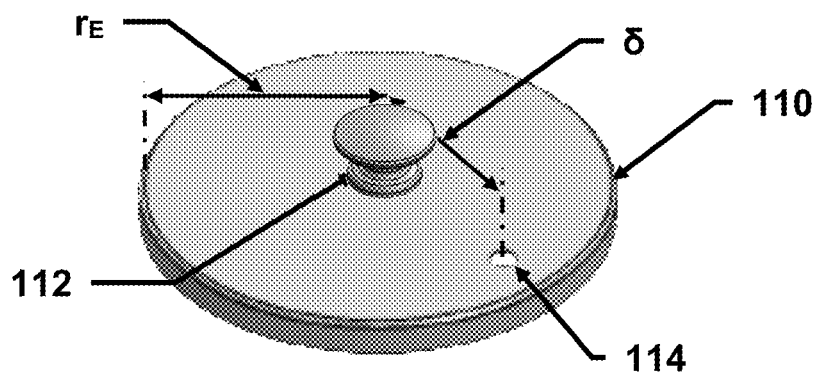
FIG. 8 is a simple perspective schematic representation of a lid to be used with the invention container.
Figure 9:
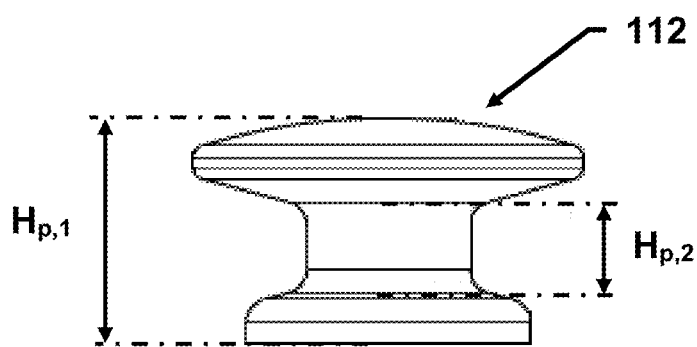
FIG. 9 is a frontal plane schematic representation of a knob that may be attached to a lid used with the invention container.

The lid (110) has a circular shape, as illustrated in FIG. 8, and it adjusts to the upper rim of the barrel (120), either in its internal face (FIGS. 1 and 4), or its external face (FIGS. 5 and 6), and it includes an orifice (114) with a 13-mm diameter (or ½ in), to relieve pressure; it is located at a distance (δ) from the center of the lid (110) of 70-75% of its radius to the periphery (rE); the lid has a fixed central knob (112), and as illustrated in FIG. 9, it has a height (Hp, 1) and a diameter that allow user to hold it, and a neck (Hp, 2) where user's fingers fit; the knob (112) has rounded borders to prevent damage to user during the use of the container of the invention (100).

Internal Elements

Base of the Set (160)

Figure 10:
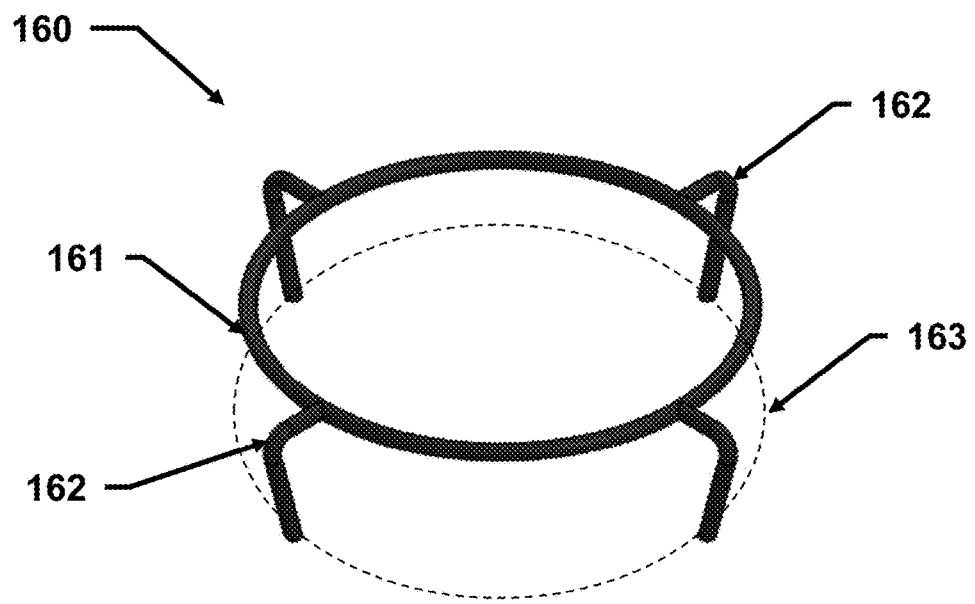
FIG. 10 is a simple perspective schematic representation of a preferable embodiment of a rod base to be used with the container of the invention.
Figure 11:
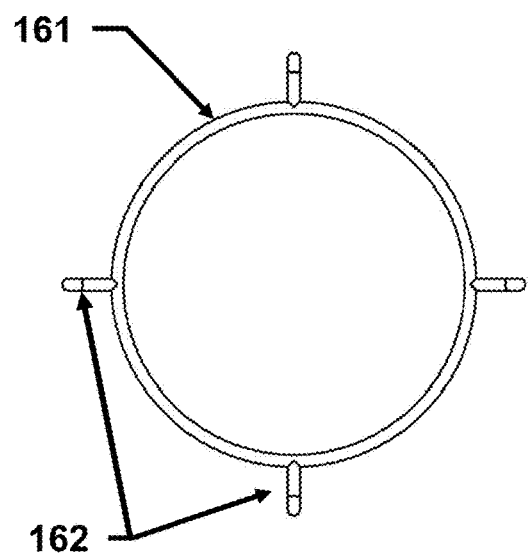
FIG. 11 is a superior plane schematic representation of a preferred embodiment of a rod base to be used with the container of the invention.
Figure 12:
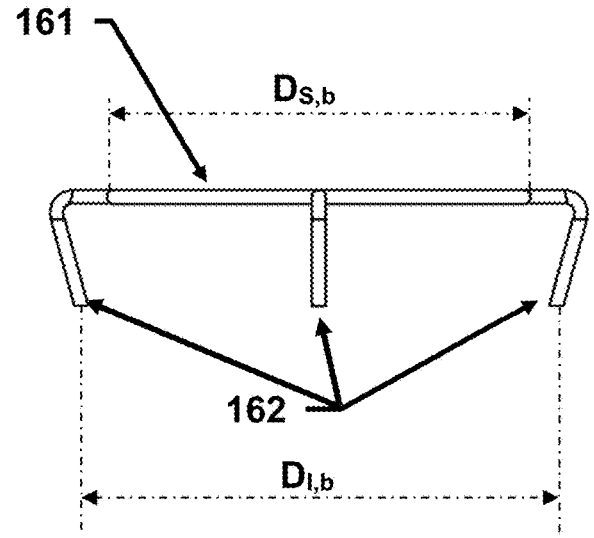
FIG. 12 is a frontal plane schematic representation of a preferred embodiment of a rod base to be used with the container of the invention.

The base that supports of the set (160), illustrated in FIGS. 10 to 12, is manufactured in stainless steel, and it consists of a ring (161) with a diameter (DS,b) that is 70% of the internal diameter (D) of the barrel (120); it has several legs (162), which in a preferred embodiment are four, in the shape of an inverted "L", located and fixed equidistantly around the ring (161), which extend towards the outside of the ring (161) such a length that they do not reach the barrel (120) wall, and which long ends extend downwards and are tilted towards the inside to be placed over an imaginary circumference (163) with a slightly larger diameter (DI,b) than the diameter of the ring (161) to rest on the peripheral ring (130) of the base of the barrel (120) and to provide stability to the set of elements that it supports.

Tray (170)

Figure 13:
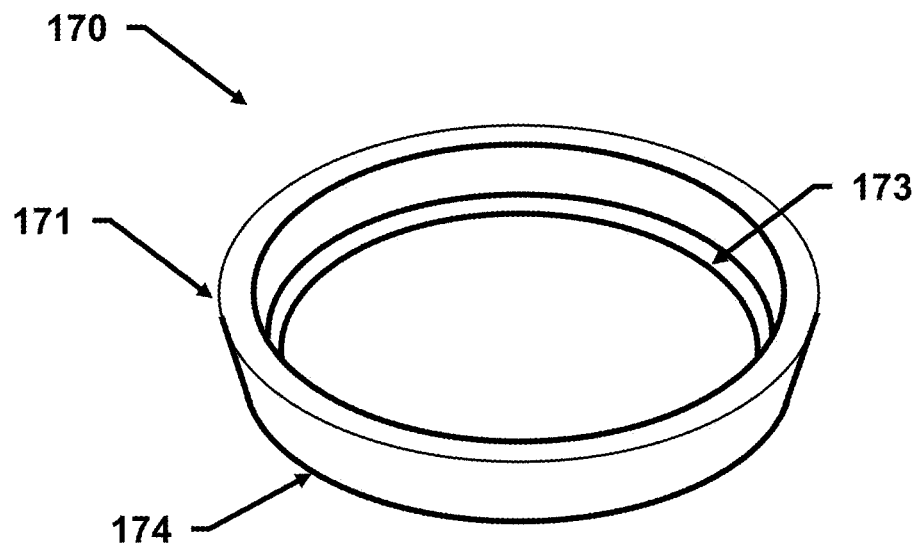
FIG. 13 is a simple perspective schematic representation of a preferred embodiment of a tray to be used with the container of the invention.
Figure 14:
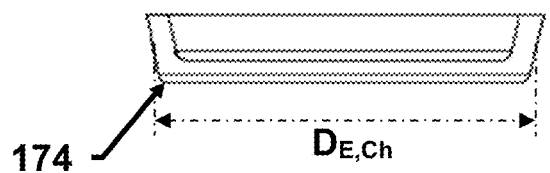
FIG. 14 is a frontal plane and diametral section schematic representation of a preferred embodiment of a tray to be used with the container of the invention.

The tray (170) for catching drips from the food being cooked, illustrated in FIGS. 13 and 14, is manufactured from a refractory material, with a vitrified internal surface, with the purpose of keeping drippings at such a temperature that the smoke point is not reached; it has an external diameter in its external border (171) greater than the internal diameter of the ring (161) of the base of the set (160), to be supported by it; the vertical wall is slightly conical, therefore, the external diameter at the border of the base (174) is smaller than the diameter of the upper border (171), to introduce the base of the tray (170) inside the ring (161), until the external diameter of the tray (DE,Ch) fits in the opening of the ring (161) of the base of the set (160); the tray (170) does not include handles preferably, but if it has them, such handles are located diametrically opposed, as indicated in the Figures.

Rod (180)

Figure 15:
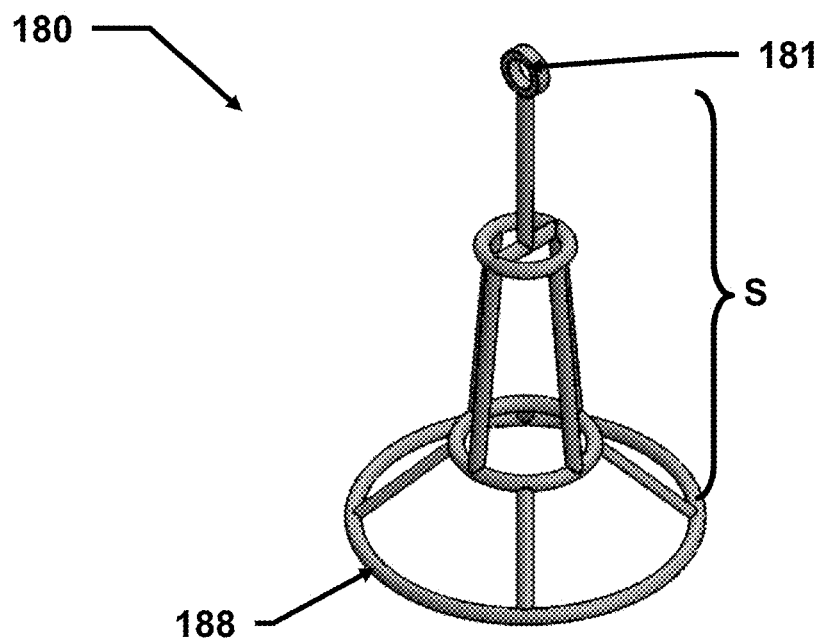
FIG. 15 is a simple perspective schematic representation of a preferred embodiment of a pole to be used with the container of the invention.
Figure 16:
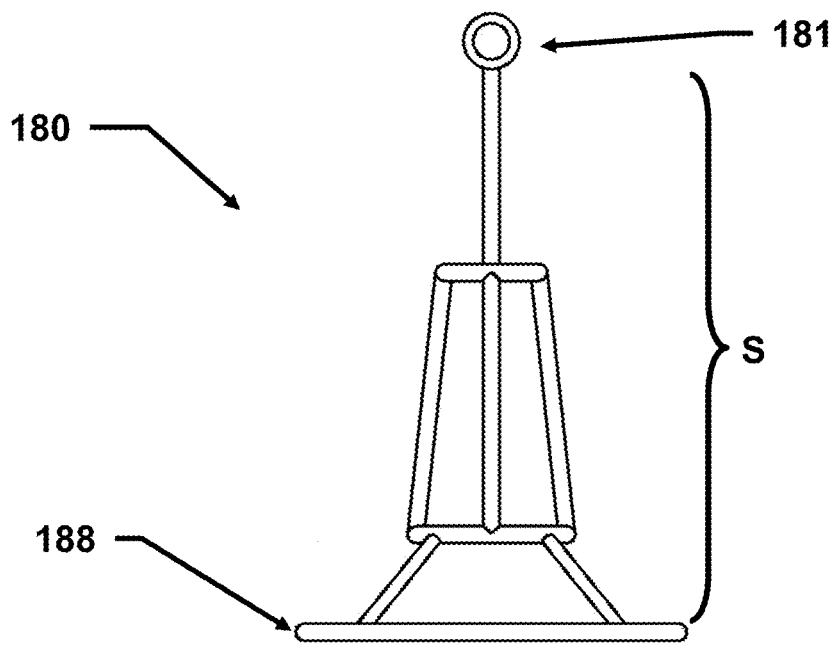
FIG. 16 is a frontal plane schematic representation of a preferred embodiment of the rod to be used with the container of the invention.

The rod (180), one of which embodiments is illustrated in FIGS. 15 and 16, is an element for supporting the food in a position where the hot air flow circulating inside the barrel (120) surrounds it completely to cook it uniformly; it is comprised of stainless-steel rods and rings, joined together, with a total height to fit and support the food to be cooked, for example, poultry such as a chicken or turkey. It is comprised of a support(S), sufficiently robust and with such a design that allows hot air circulation; the lower ends of this support(S) are fixed to a lower ring (188) that forms the base of the pole (180) and which is intended to stand on the internal surface of the tray (170).

Deflecting Cone (190)

Figure 6:
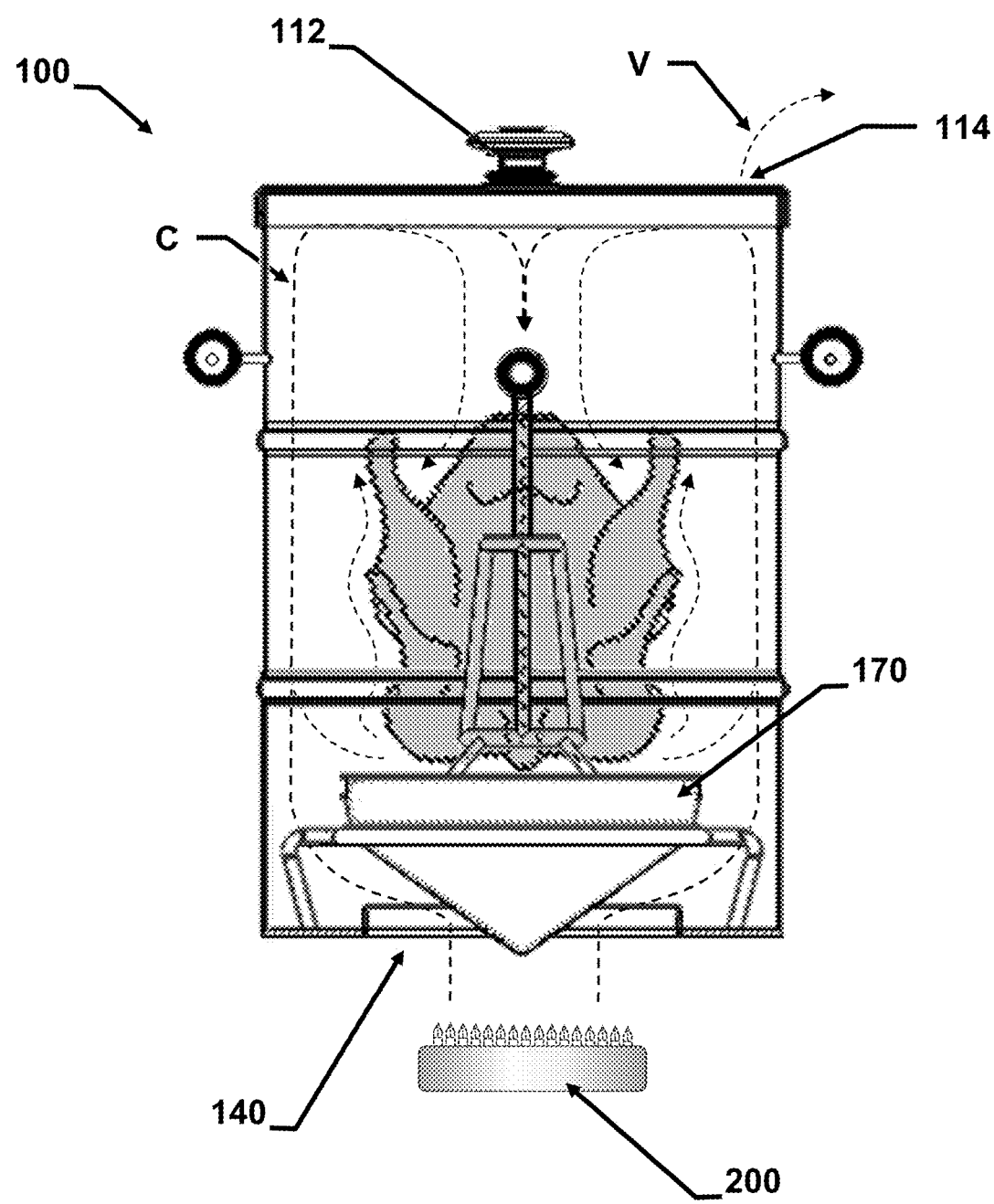
FIG. 6 is a frontal sectional schematic view of the barrel wall, along the A-A axis indicated in FIG. 2, of the kitchen container of the invention, showing the internal elements and a chicken in use position.

A fundamental element for the appropriate operation of this invention is a heat deflecting cone (190), see FIGS. 3, 5 and 6, that directs hot gases from the burner (200) towards the inner wall of the barrel (120) in an upward direction (FIG. 6), promoting its circulation, as indicated by the arrows (C), in a convection movement; the deflecting cone (190) has a diameter in its upper border, which is open, so it may rest on the ring (161) of the base of the set (160) when inserted in it, and its height to the vertex is 30-35% of its diameter. The heat deflecting cone (190) maintains the temperature of the material that drips on the tray (170) under the smoke point of the fat on the tray (170), around 170° C., preventing in this way the evaporation or boiling of the fat, and preventing it from turning into smoke and generating undesirable substances that alter the flavor and quality of the food being cooked.

In addition to heat diffusion, the diffusing cone (190) has a safety function, by being able to receive drippings from the tray (170), due to overflow, rupture or cracking thereof, preventing them coming into direct contact with the fire, which would generate smoke and other non-desirable compounds.

Additional Elements

In order not to require a visual surveillance of the cooking process, it is recommended to use a thermometer, preferably a digital wireless one, to monitor cooking and alert when the meat reaches the desirable internal temperature (around 78° C.), to remove the container of the invention (100) from the fire, let it stand and serve.

Preferred Embodiment of the Invention

In a preferred embodiment of the invention, a kitchen container is described, to prepare "chicken in the barrel", enough for 4 or 5 portions, in the following way:

Manufacturing Parameters

The barrel is a cylinder 360-mm high with a 250-mm diameter, manufactured from 1-mm thick, cold-rolled steel sheet; the orifice in the inferior face has a 150-mm diameter, and its inner rim is 15 mm high. Two handles for transportation of the container have been placed in diametrically opposed positions, they are cylindrical, 54 mm long and with an 18-mm external diameter, with rims at each end, with a 24-mm external diameter; the cylinders have a 5-mm-diameter central orifice to allow a 4-mm-diameter round rod to go through, with a total length of 65 mm, and which arms extend 30 mm.

The lid has a 257-mm external diameter, in order to attach outside the upper rim of the barrel; the pressure-relief orifice is located 95 mm from the center of the lid, and it has a 13-mm diameter; the lid has a 28-mm-high knob, with a maximum diameter of 48 mm in the zone where user holds it, a 20-mm diameter and a 35-mm-diameter base, all of them with rounded borders.

The base of the rod has been manufactured in 304 stainless steel, it is 6-mm in diameter, with a total height of 50 mm, a maximum diameter of the upper ring of 170 mm, with four legs that extend towards the outside the ring 30 mm, and which low ends slant towards the interior 10 mm.

The tray for catching drippings has been manufactured in a refractory material, such as GRES clay (high-temperature, low porosity paste), with a vitrified internal surface. It has a 175-mm external diameter on its upper rim, and it is 10 mm thick, its internal diameter at the base is 146 mm, and its total height is 30 mm; the tray includes handles located in diametrically opposed positions, which extend 15 mm outside the tray.

The rod is made of 304 stainless steel, it is 6-mm thick, with a total height of 225 mm, with a ring-shaped handle with a 20-mm external diameter, and 13-mm internal diameter, located on the upper end of a 70-mm high vertical rod; there is a transversal rod at the lower end of the rod, to attach such lower end to a ring with a 40-mm external diameter; four rods extend downwards to a ring with a 60-mm external diameter, forming a second body that comprises the base of the rod.

Finally, the deflecting cone is made of 1.5-mm thick stainless steel, it has a 175-mm diameter upper rim, and its height to the vertex is 60 mm.

Parameters of Use

The heat source is a low-pressure gas stove, with a 2000 to 3000-BTU burner, which may generate an internal temperature in the barrel of 210° C., and due to the deflecting cone, the juices caught in the tray are kept at a temperature under 170° C.

Cooking time may vary according to the BTUs generated by the burner, but in general, cooking takes between 60 to 80 minutes. One of the key features of this invention is that it achieves coal-type cooking, with crunchy skin, and it generates zero smoke emissions during the whole cooking process.

Results

By comparing food cooked in this invention to food from conventional kitchen ovens, and to a charcoal grill, chicken cooked in a conventional oven is "dryer" and the skin is not crunchy. In the case of charcoal grilled chicken, it has a similar quality regarding juiciness achieved, but with this invention the inconveniences of lighting charcoal are eliminated, and the food is cooked generating a fraction of the pollution generated by coal.

OTHER EMBODIMENTS

Rods with an alternative design to the one described here can be used, adapted to spit-roast other types of food, specifically charcuterie, such as sausages and "chorizo", chicken wings, and meat cuts of up to 4-5 portions.

A knowledgeable person on the subject can appreciate that the parameters described in this example may be modified due to the nature of the food being cooked and by specific conditions (the "recipe"), also, the dimensions of the invention container may be modified to adapt to specific capacity requirements, and it will be evident that such alternatives are within the scope of the protection of this invention.

What is claimed is:

1. A kitchen container for roasting or spit-roasting food by direct exposure to hot air from a burner, the kitchen container comprising an external container, a lid and a set of support elements within the external container, wherein:
   a) the external container is a hollow metallic cylinder having a bottom, an external wall, handles including insulating material, peripheral reinforcement rings about the external wall, where the bottom has a circular orifice therein, the circular orifice having a rim that extends towards an inside of the external container, and where the bottom has a support ring between the external wall and the rim of the circular orifice;
   b) the lid is circular, having an adjustable diameter to accommodate communication with an upper opening of the external container, and includes a relief orifice for pressure relief and ventilation, and a knob for manipulation of the lid;
   c) the set of support elements include:
      i) a rod for support and location of the food to be cooked, the rod configured to be centrally located within the external container and to allow contact of the hot air with exposed surfaces of the food to be cooked,
      ii) a tray to catch juices and fat from the food to be cooked,
      iii) a deflecting cone having a vertex facing downwards, the deflecting cone configured to direct the hot air from the burner towards an inner wall of the external container and upwardly, thereby promoting hot air circulation within the external container and facilitating the tray to catch juices and fat from the food to be cooked, and
      iv) a base to support the set of support elements on the support ring on the bottom of the external container, the base having an upper ring and several legs fixed to the upper ring,
   wherein, for use of the kitchen container, the set of support elements are configured as follows: a bottom of the rod is located inside the tray, resting on an internal face of the tray; the tray is located on the deflecting cone; the deflecting cone is supported by the upper ring of the base; the set of support elements being located inside the external container with the base resting on the support ring on the bottom of the external container.

2. The kitchen container of claim 1, wherein the circular orifice in the bottom of the external container has a diameter "d," and a diameter ratio "d/D," relative to an internal diameter of the external container "D," is d/D=0.6.

3. The kitchen container of claim 1, wherein the rim of the circular orifice in the bottom of the external container has a height of 15 to 20 mm.

4. The kitchen container of claim 1, wherein the peripheral reinforcement rings of the external wall of the external container are shaped by corrugating the external wall when manufacturing the external container.

5. The kitchen container of claim 1, wherein the peripheral reinforcement rings of the external wall of the external container are shaped independently from a manufacturing of the external container and are subsequently attached thereto.

6. The kitchen container of claim 1, wherein the lid is circular, with a diameter configured to be adjustable to communicate with at least an internal face of the upper opening of the external container.

7. The kitchen container of claim 1, wherein the lid is circular, with a diameter configured to be adjustable to communicate with at least an external face of the upper opening of the external container.

8. The kitchen container of claim 1, wherein the rod is comprised of inferior rods and rings linked together to support the food to be cooked, and to allow hot air circulation, where lower ends of certain inferior rods are attached to a lower ring that forms a base that rests on an internal surface of the tray.

9. The kitchen container of claim 1, wherein the tray is made of a refractory material with a vitrified internal surface, whereby drippings are kept at a temperature that does not reach a smoke point.

10. The kitchen container of claim 1, wherein an upper border of the tray has an external diameter greater than a diameter of the upper ring of the base, wherein a wall of the tray is conically shaped to allow an insertion of a bottom of the tray inside the upper ring of the base.

11. The cooking container of claim 1, wherein the base is made of stainless steel, the upper ring of the base has a diameter that is 70% of an internal diameter of the barrel, and the base has several legs that extend downwards, located and resting equidistantly around the support ring on the bottom of the external container.

12. The kitchen container of claim 1, wherein an upper border of the deflecting cone has a diameter sufficient for the deflecting cone to rest on the upper ring of the base, where a height of the deflecting cone from the upper border to the vertex is 30-35% of the diameter of the upper border of the deflecting cone.

* * * * *